US008484985B2

(12) United States Patent
Kadle et al.

(10) Patent No.: US 8,484,985 B2
(45) Date of Patent: Jul. 16, 2013

(54) AIR CONDITIONER SYSTEM HAVING AN EXTERNALLY CONTROLLED VARIABLE DISPLACEMENT COMPRESSOR AND A CLUTCH AND METHOD OF OPERATING THE SAME

(75) Inventors: Prasad S. Kadle, Williamsville, NY (US); Mark J. Zima, Clarence Center, NY (US); Joseph M. Bona, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 888 days.

(21) Appl. No.: 12/633,896

(22) Filed: Dec. 9, 2009

(65) Prior Publication Data

US 2010/0242510 A1 Sep. 30, 2010

Related U.S. Application Data

(60) Provisional application No. 61/165,059, filed on Mar. 31, 2009.

(51) Int. Cl.
*F25B 1/00* (2006.01)
(52) U.S. Cl.
USPC .................................. 62/115; 62/127; 62/244
(58) Field of Classification Search
USPC ............. 62/56, 126, 127, 129, 156, 155, 229, 62/244, 157, 231, 158; 165/43, 200; 700/275, 700/276, 299
See application file for complete search history.

(56) References Cited

U.S. PATENT DOCUMENTS

| | | | | |
|---|---|---|---|---|
| 4,540,040 A | * | 9/1985 | Fukumoto et al. | 165/202 |
| 5,122,956 A | * | 6/1992 | Satoh et al. | 701/62 |
| 5,188,204 A | * | 2/1993 | Arrowsmith et al. | 192/3.58 |
| 5,191,768 A | * | 3/1993 | Fujii | 62/209 |
| 5,377,797 A | * | 1/1995 | Mustapha et al. | 192/3.55 |
| 5,553,776 A | * | 9/1996 | Davis et al. | 236/49.3 |
| 5,884,497 A | * | 3/1999 | Kishita et al. | 62/193 |
| 5,904,052 A | * | 5/1999 | Inoue et al. | 62/244 |
| 6,109,045 A | * | 8/2000 | Takenaka | 62/175 |
| 6,230,507 B1 | * | 5/2001 | Ban et al. | 62/228.4 |
| 6,287,081 B1 | * | 9/2001 | Tamegai et al. | 417/15 |
| 6,293,116 B1 | | 9/2001 | Forrest et al. | |
| 6,434,958 B1 | * | 8/2002 | Koors et al. | 62/176.1 |
| 6,735,962 B2 | * | 5/2004 | Iwanami et al. | 62/133 |
| 6,796,135 B1 | * | 9/2004 | Bhatti et al. | 62/150 |
| 6,986,645 B2 | * | 1/2006 | Iwanami et al. | 417/16 |
| 7,302,805 B2 | * | 12/2007 | Tille et al. | 62/208 |
| 7,308,799 B1 | * | 12/2007 | Harrison | 62/133 |
| 7,337,622 B2 | * | 3/2008 | Wang et al. | 62/150 |
| 7,404,435 B2 | * | 7/2008 | Samukawa et al. | 165/204 |
| 7,414,206 B2 | * | 8/2008 | Kikuya | 200/5 R |
| 7,578,139 B2 | * | 8/2009 | Nishikawa et al. | 62/228.3 |
| 7,690,213 B2 | * | 4/2010 | Inaba | 62/238.6 |
| 8,082,745 B2 | * | 12/2011 | Sawada et al. | 62/193 |
| 2001/0027659 A1 | * | 10/2001 | Ota et al. | 62/228.3 |
| 2002/0078700 A1 | * | 6/2002 | Kelm et al. | 62/236 |
| 2006/0016203 A1 | * | 1/2006 | Hayashi | 62/228.3 |

(Continued)

*Primary Examiner* — Mohammad M Ali
(74) *Attorney, Agent, or Firm* — Lawrence D. Hazelton

(57) ABSTRACT

A vehicle air conditioner system having, and method of operating, an externally controlled variable displacement compressor and a compressor clutch. If the system is operating during conditions when the operating displacement is low, the efficiency of the system is increased by duty cycling the clutch. Operating an externally controlled variable displacement compressor in this manner can also prevent overcooling by the air conditioner.

10 Claims, 2 Drawing Sheets

U.S. PATENT DOCUMENTS

2006/0048531 A1* 3/2006 Eisenhour ............... 62/228.3
2007/0289326 A1* 12/2007 Nishikawa et al. ........... 62/498
2008/0085672 A1* 4/2008 Creed et al. ............... 454/69
2008/0289347 A1 11/2008 Kadle et al.

* cited by examiner

AIR CONDITIONER SYSTEM HAVING AN EXTERNALLY CONTROLLED VARIABLE DISPLACEMENT COMPRESSOR AND A CLUTCH AND METHOD OF OPERATING THE SAME

RELATED APPLICATIONS

This application claims the benefit of U.S. Provisional Application No. 61/165,059 filed Mar. 31, 2009.

TECHNICAL FIELD OF INVENTION

The invention generally relates to vehicle air conditioners, and more particularly relates to a system and method for controlling an externally controlled variable displacement compressor and having a clutch.

BACKGROUND OF INVENTION

A vehicle air conditioner may use an internally controlled variable displacement compressor (INT-COMP), or an externally controlled variable displacement compressor (EXT-COMP) to compress refrigerant. The INT-COMP, also known as a pneumatically-controlled or passively-controlled variable displacement compressor, varies compressor displacement based on refrigerant pressures within the compressor. The lowest operating displacement of the INT-COMP is limited to insure proper startup conditions, and so employs a clutch to disengage the INT-COMP when air conditioning is not requested or the load on the air conditioner is low. The EXT-COMP, also known as an actively-controlled variable displacement compressor, varies compressor displacement in response to a signal from a controller that is based on one or more environmental sensors. An INT-COMP is generally less expensive than an EXT-COMP because the INT-COMP does not need a controller or environmental sensors. However, an EXT-COMP is considered to be more energy efficient because the displacement or stroke of the compressor can be optimized for the environmental conditions and air conditioning demands at hand.

When an EXT-COMP is operated at moderate to high displacements, a large portion of the total energy consumed provides cooling, and only a small portion of the total energy is lost to reciprocating losses within the compressor. However, when operating at lower displacement levels, a greater fraction of the total energy is consumed by reciprocating losses, so the relative efficiency of the compressor is reduced when compared to the same compressor operating at higher displacement levels.

What is needed is a way to increase the operating efficiency of an externally-controlled variable displacement compressor when the compressor is operating at lower displacement levels.

SUMMARY OF THE INVENTION

In accordance with this invention, a method for operating a vehicle air conditioner system having an externally controlled variable displacement compressor is described. The compressor has an operating displacement that is variable and is equipped with a clutch. The clutch is engaged to couple mechanical energy to the externally controlled variable displacement compressor. An environmental signal is received to indicate an environmental condition relevant to the vehicle air conditioner. A displacement control signal that is based on the environmental condition is output to influence the operating displacement of the externally controlled variable displacement compressor. The clutch is disengaged if the displacement control signal is less than a threshold.

In accordance with another aspect of this invention, a vehicle air conditioner system includes an externally controlled variable displacement compressor adapted to receive a displacement control signal to influence an operating displacement of the compressor. The system also includes a clutch for coupling mechanical energy to the compressor. The clutch is adapted to receive a clutch control signal to engage and disengage the clutch. The system also includes a controller adapted to receive an environmental signal indicative of an environmental condition relevant to the vehicle air conditioner, output a displacement control signal based upon the environmental signal, and output a clutch control signal based upon the displacement control signal.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

The present invention will be described, by way of example, with reference to the accompanying drawings, in which.

DETAILED DESCRIPTION OF INVENTION

Figure 1:
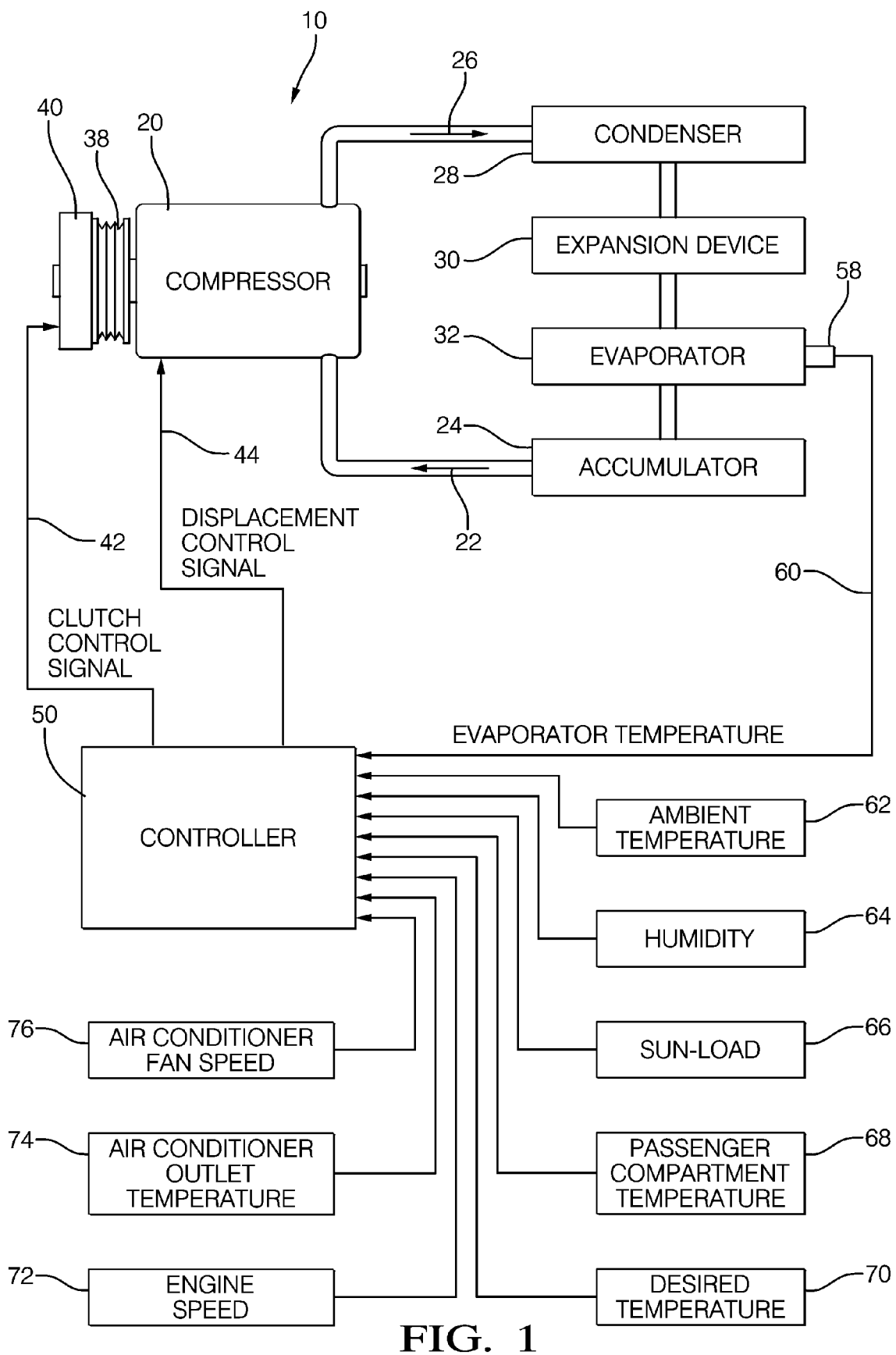
FIG. 1 is a block diagram of an air conditioner system, according to one embodiment.

Referring to FIG. 1, in accordance with a preferred embodiment of this invention, an air conditioner system 10 is illustrated. The system 10 includes an externally controlled variable displacement compressor 20 that receives expanded refrigerant 22 from an accumulator/dehydrator 24, and discharges compressed refrigerant 26 to a condenser 28. Refrigerant from the condenser 28 passes through an expansion device 30 where the expansion of refrigerant from a liquid to a gas reduces the temperature of the refrigerant. The reduced temperature refrigerant passes through an evaporator 32 to reduce the temperature of the body of the evaporator and then returns to the accumulator/dehydrator 24. Air destined for the vehicle passenger compartment passes over the body of the evaporator 32 and is cooled. Alternately, the expansion device 30 may be a thermostatic expansion valve (TXV) and the accumulator/dehydrator 24 may be a receiver/dehydrator that is placed between the condenser and the TXV. Furthermore, the receiver/dehydrator may be incorporated into the condenser.

The externally controlled variable displacement compressor 20 has a pulley 38 that is mechanically coupled to the vehicle engine (not shown) by an accessory drive belt (not shown). The compressor 20 is coupled to a clutch 40 that, when engaged, couples the compressor 20 to the pulley 38 so that mechanical energy from the engine actuates or reciprocates components within the compressor 20 such that refrigerant is compressed. If the clutch 40 is disengaged, the pulley 38 is not coupled to the compressor 20 and components within the compressor 20 do not reciprocate.

U.S. Pat. No. 6,293,116 to Forrest et al. and United States Patent Application Publication Number 2008/0289347 by Kadle et al. are hereby incorporated by reference. U.S. Pat. No. 6,293,116 to Forrest et al. describes a method of operating an externally controlled variable displacement compressor having a clutch. Forrest et al. engages clutch in response to a vehicle operator turning the air conditioner on and disengages the clutch in response to the vehicle operator turning the air conditioner off. Patent Application Publication Number 2008/0289347 by Kadle et al. describes a method to operate a pneumatically-controlled or internally-controlled variable displacement compressor that achieves energy efficiencies approaching the energy efficiencies of an externally-controlled variable displacement compressor by duty-cycling a clutch coupled to the internally-controlled variable displacement compressor.

It was discovered that the efficiency of an air conditioner using an externally controlled variable displacement compressor could be increased by duty-cycling the clutch during low displacement operating conditions. Prior to this discovery, the benefit of using a clutch coupled to an externally controlled variable displacement compressor for other than turning the air conditioner on and off in response to a vehicle operator selecting or deselecting air conditioning was not recognized. Duty-cycling to an externally controlled variable displacement compressor during low displacement operating conditions is advantageous because during lower displacement operation, a larger fraction of the total energy consumed is lost to reciprocating losses, thereby reducing the relative operating efficiency of the compressor. Additionally, since the clutch is not operated continuously, electrical energy consumption by the clutch is also reduced.

Referring again to FIG. 1, an operating displacement of compressor 20 is adjusted or influenced by a displacement control signal 44. A clutch control signal 42 determines if the clutch 40 is engaged or disengaged. A controller 50 may be adapted to output the displacement control signal 44 and the clutch control signal 42. The controller 50 may also determine the displacement control signal 44 and the clutch control signal 42 based on signals from one or more environmental sensors. The environmental sensors may include, but are not limited to, an evaporator temperature signal 60 from a temperature sensor 58 attached to the body of the evaporator 32 for indicating the temperature of the evaporator, an ambient temperature sensor 62 for indicating an air temperature outside the vehicle, a humidity sensor 64 for indicating relative humidity inside or outside the vehicle, a sun-load sensor 66 for indicating an amount of heat in the passenger compartment caused by the sun, an actual passenger compartment temperature sensor 68, a desired temperature sensor 70 for determining a desired passenger compartment temperature indicated by an operator, an engine speed sensor 72 useful for estimating a rotational speed of the compressor 20, an air conditioner outlet temperature sensor 74 for indicating the temperature of air at the outlets to the passenger compartment, and air conditioner fan speed sensor useful to estimate the rate of cooling at condenser 28. The controller 50 is preferably equipped with a microprocessor capable of receiving the various environmental signals, and making calculations or performing table look-ups to determine the displacement control signal 44 and the clutch control signal 42.

By way of an example, for moderate temperatures such as 40° F. to 60° F. for example, the load on the air conditioner system 10 is likely to be low, so the compressor 20 may be operating at low displacement. Compressor 20 efficiency is increased by duty-cycling the clutch 40 or periodically disengaging the clutch 40 for a period of time. Duty-cycling the clutch 40 duty-cycles the compressor 20 during operation at low displacement, the air conditioner system 10 can provide a proper degree of cooling more efficiently than would be possible without duty-cycling. Furthermore, during certain conditions, there is a potential of overcooling the evaporator 32, thereby overcooling the air discharged by the air conditioner system 10. Duty cycling the compressor 20 is also useful to prevent overcooling. An analysis indicates that a typical fuel savings of 1.4 gallons of gas per vehicle per year is possible by employing duty cycling when compared to other alternatives such as series reheating where air is heated preferably before or alternately after passing over the evaporator.

Figure 2:
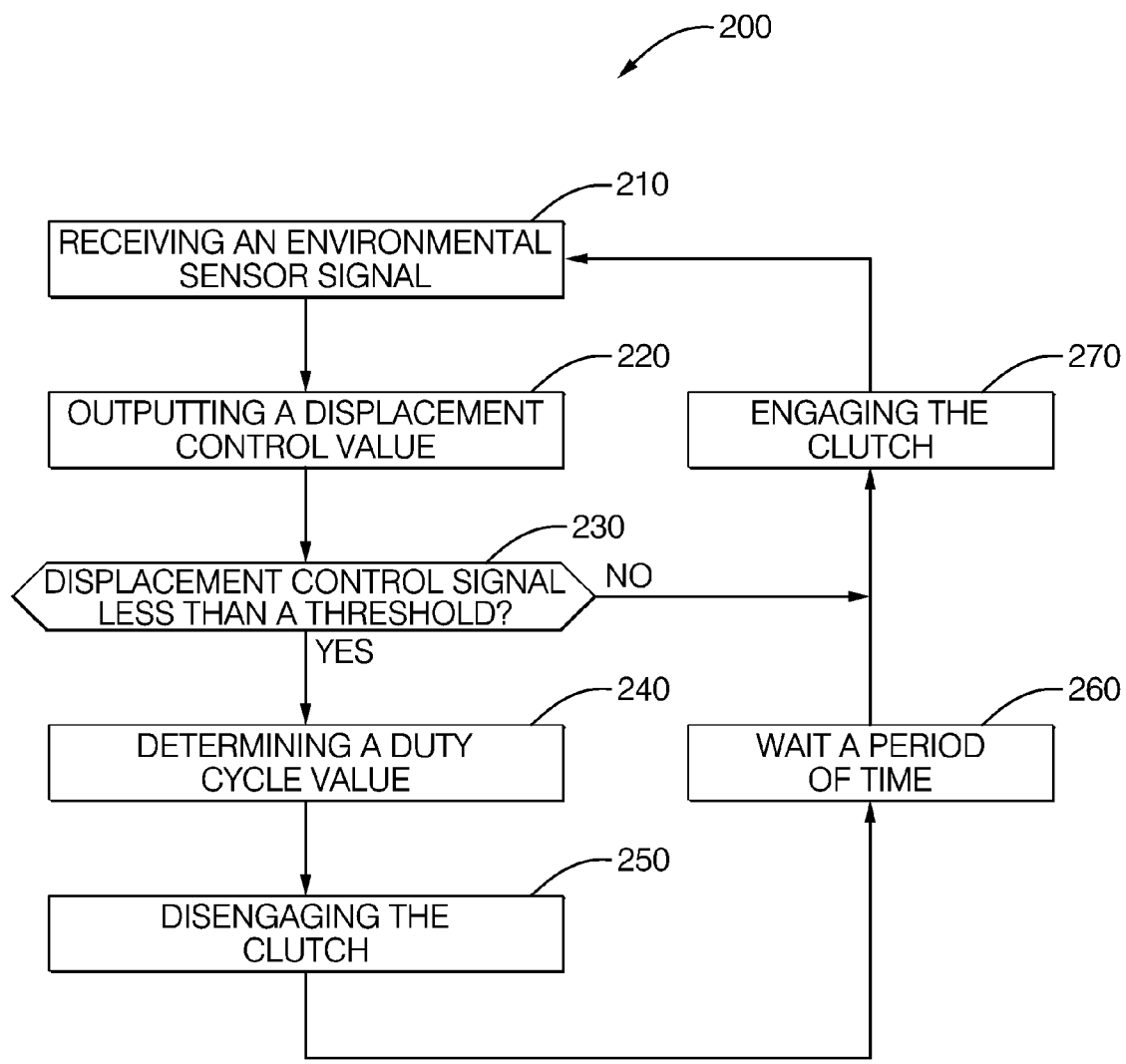
FIG. 2 is a flow chart of a method for operating the system of FIG. 1.

FIG. 2 shows a flow chart 200 of a method of operating an externally controlled variable displacement compressor 20 having a clutch 40 that is part of a vehicle air-conditioning system 10. At step 210, a controller 50 receives an environmental sensor signal from one or more sensors 58 and 62-70. At step 220, controller 50 outputs a displacement control signal 44. The displacement control signal is based on the environmental sensor signal. At step 230 the displacement control signal 44 is compared to a threshold. If the displacement control signal 44 is greater than the threshold, then clutch remains engaged. If the displacement control signal 44 is less than the threshold, it may be necessary to duty-cycle or periodically disengage the clutch 40 so the evaporator 32 is not overcooled and/or to improve compressor efficiency. At step 240 the controller 50 determines a duty cycle value based on the displacement value and the environmental sensor signal. At step 250 the controller outputs a clutch disengage signal effective to disengage the clutch 40. Step 260 may be controlled by a timer configured keep the clutch disengaged for a period of time or based on an environmental input. After the period of time passes, at step 270, clutch is engaged.

The threshold is typically determined by experimental methods wherein sample vehicles are exposed to various environmental conditions. Alternately, the threshold may be determined by a computer model. The duty cycle value may be based on a formula, or generated using a look-up table developed from test data, or by any of a number of known techniques. The result of the determination is easily understood if presented in the form of a percentage duty-cycle. For a displacement control signal that is only slightly below the threshold, the duty-cycle will be relatively high and the clutch will spend most of its time engaged, or the period of time that the clutch is disengaged will be relatively short. For example, if flowchart 200 is initiated once every 10 seconds and the duty-cycle is determined to be 90%, then the period of time the clutch is disengaged is 1 second. Alternately, for a displacement control signal is significantly lower than the threshold, such that the duty-cycle is determined to be 20% for example, then the period of time that the clutch will be disengaged is 8 seconds. Step 250 indicates outputting a clutch control signal to disengage the clutch for a period of time, wherein the period of time is based on the compressor duty-cycle value. As described above, the period of time is a function of the rate at which the clutch is to be cycled and the determined duty cycle value. Step 260 indicates waiting the period of time before moving to step 270 to engage the clutch.

While this invention has been described in terms of the preferred embodiments thereof, it is not intended to be so limited, but rather only to the extent set forth in the claims that follow.

We claim:

1. A method for operating a vehicle air conditioner system having an externally controlled variable displacement compressor, said compressor having an operating displacement that is variable and equipped with a clutch, said method comprising:

engaging the clutch to couple mechanical energy to the externally controlled variable displacement compressor;

receiving an environmental signal indicative of an environmental condition relevant to the vehicle air conditioner;

outputting a displacement control signal based on the environmental condition to influence the operating displacement of the externally controlled variable displacement compressor; and disengaging the clutch if the displacement control signal is less than a threshold.

2. The method in accordance with claim 1, wherein the step of receiving an environmental signal includes receiving signals from one or more sensors.

3. The method in accordance with claim 2, wherein the one or more sensors are selected from a group comprising: ambient air temperature, desired passenger compartment temperature, actual passenger compartment temperature, evaporator temperature, air conditioner outlet temperature, sun-load, humidity, engine speed, and air-conditioner fan speed.

4. The method in accordance with claim 1, further comprising:

determining a duty cycle value when the displacement control signal is less than a threshold.

5. The method in accordance with claim 4, further comprising:

engaging the clutch a period of time following disengaging the clutch, wherein the period of time is based on the duty cycle value.

6. The method in accordance with claim 4, further comprising:

engaging and disengaging the clutch periodically based on the duty cycle value.

7. A vehicle air conditioner system comprising:

an externally controlled variable displacement compressor adapted to receive a displacement control signal to influence an operating displacement of the compressor;

a clutch for coupling mechanical energy to the compressor, said clutch adapted to receive a clutch control signal to engage and disengage the clutch;

a controller adapted to receive an environmental signal indicative of an environmental condition relevant to the vehicle air conditioner, output a displacement control signal based upon the environmental signal, and output a clutch control signal based upon the displacement control signal.

8. The system in accordance with claim 7, wherein the controller is further adapted to duty cycle the clutch control signal when the displacement control signal is below a threshold.

9. The system in accordance with claim 7, further comprising one or more sensors for providing the signal indicative of an environmental condition.

10. The system in accordance with claim 9, wherein the one or more sensors are selected from a group comprising: ambient air temperature, desired passenger compartment temperature, actual passenger compartment temperature, evaporator temperature, air conditioner outlet temperature, sun-load, humidity, engine speed, and air-conditioner fan speed.

\* \* \* \* \*